(12) United States Patent
Villa et al.

(10) Patent No.: US 11,267,570 B2
(45) Date of Patent: Mar. 8, 2022

(54) QUAD-WING VERTICAL TAKEOFF AND LANDING AIRCRAFT

(71) Applicant: Joby Aero, Inc., Santa Cruz, CA (US)

(72) Inventors: Ian Andreas Villa, San Francisco, CA (US); Mark Moore, San Francisco, CA (US); Robert Alan McDonald, San Luis Obispo, CA (US); Henry Thome Won, Los Osos, CA (US); Adam Chase, San Luis Obispo, CA (US); Alex Michael Gary, San Luis Obispo, CA (US); Cory Seubert, San Luis Obispo, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 276 days.

(21) Appl. No.: 16/356,276

(22) Filed: Mar. 18, 2019

(65) Prior Publication Data
US 2019/0337613 A1   Nov. 7, 2019

Related U.S. Application Data (60) Provisional application No. 62/666,652, filed on May 3, 2018.

(51) Int. Cl.
*B64C 29/00* (2006.01)
*B64C 23/00* (2006.01)
(Continued)

(52) U.S. Cl.
CPC ............ *B64C 29/0025* (2013.01); *B64C 5/08* (2013.01); *B64C 9/00* (2013.01); *B64C 23/00* (2013.01);
(Continued)

(58) Field of Classification Search
CPC ........ B64C 2009/005; B64C 2201/104; B64C 23/00; B64C 25/06; B64C 27/10;
(Continued)

(56) References Cited

U.S. PATENT DOCUMENTS 5,295,643 A * 3/1994 Ebbert .................... B64C 29/02
244/7 B
6,293,491 B1 * 9/2001 Wobben .................. B64C 31/00
244/17.23

(Continued)

FOREIGN PATENT DOCUMENTS

| FR | 2521521 | 8/1983 |
| WO | 2016135697 | 9/2016 |
| WO | 2019213540 | 11/2019 |

OTHER PUBLICATIONS

"International Application Serial No. PCT US2019 030628, International Search Report dated Jul. 17, 2019", 5 pgs.
(Continued)

*Primary Examiner* — Medhat Badawi
(74) *Attorney, Agent, or Firm* — Schwegman Lundberg & Woessner, P.A.

(57) ABSTRACT

A vertical takeoff and landing (VTOL) aircraft, configured to transport passengers and/or cargo, uses propellers during vertical flight and wings during forward flight to generate lift. The VTOL aircraft includes a front wing and a rear wing connected by inboard booms. The rear wing may include a wingtip boom attached to each free end of the wing. A propeller may be attached to each inboard boom and each wingtip boom. The propellers attached to the inboard booms may be stacked propellers including at least two co-rotating propellers. The aircraft can also include a cruise propeller attached to the tail region of the fuselage, where the cruise
(Continued)

propeller is configured to rotate in a plane approximately perpendicular to the fuselage to generate thrust during forward flight.

18 Claims, 9 Drawing Sheets

(51) Int. Cl.
  *B64C 5/08*  (2006.01)
  *B64C 9/00*  (2006.01)
  *B64D 11/06*  (2006.01)
  *B64D 27/24*  (2006.01)
  *B64F 1/36*  (2017.01)
  *B64C 3/16*  (2006.01)
  *B64C 25/06*  (2006.01)

(52) U.S. Cl.
  CPC .......... *B64D 11/0601* (2014.12); *B64D 27/24* (2013.01); *B64C 3/16* (2013.01); *B64C 25/06* (2013.01); *B64C 2009/005* (2013.01); *B64F 1/362* (2013.01)

(58) Field of Classification Search
  CPC ..... B64C 27/26; B64C 27/30; B64C 29/0025; B64C 39/04; B64C 3/16; B64C 5/08; B64C 9/00; B64C 9/38; B64D 11/0601; B64D 27/24; Y02T 50/10; Y02T 50/30; Y02T 50/40; B64F 1/362
  See application file for complete search history.

(56) References Cited

U.S. PATENT DOCUMENTS

| | | | | |
|---|---|---|---|---|
| 6,607,161 | B1 * | 8/2003 | Krysinski | B64C 9/00 244/7 A |
| 8,272,593 | B2 * | 9/2012 | Choi | B64C 39/028 244/23 D |
| 10,322,814 | B1 * | 6/2019 | Tian | B64D 31/00 |
| 10,450,062 | B1 * | 10/2019 | Bova | B64C 5/06 |
| 10,577,091 | B2 * | 3/2020 | Parks | B64C 39/08 |
| 2008/0054121 | A1 * | 3/2008 | Yoeli | B64C 29/0033 244/12.1 |
| 2008/0236137 | A1 * | 10/2008 | Julliard | F01D 5/147 60/226.1 |
| 2013/0251525 | A1 * | 9/2013 | Saiz | B64C 39/06 416/23 |
| 2016/0207625 | A1 * | 7/2016 | Judas | B64C 29/0025 |
| 2016/0236774 | A1 * | 8/2016 | Niedzballa | B64D 27/24 |
| 2018/0215465 | A1 * | 8/2018 | Renteria | B64C 27/28 |
| 2018/0297695 | A1 * | 10/2018 | Ramirez-Serrano | B64C 27/08 |
| 2018/0354623 | A1 * | 12/2018 | Bhat | B64C 27/10 |
| 2019/0061901 | A1 * | 2/2019 | Long | H05B 6/362 |
| 2019/0135425 | A1 * | 5/2019 | Moore | B64C 3/10 |
| 2019/0315471 | A1 * | 10/2019 | Moore | B64C 29/0016 |
| 2019/0337614 | A1 * | 11/2019 | Villa | B64C 29/0025 |
| 2020/0062383 | A1 * | 2/2020 | Kim | B64C 3/385 |
| 2020/0269990 | A1 * | 8/2020 | Bevirt | B64D 31/06 |
| 2021/0122466 | A1 * | 4/2021 | Akers | B64C 29/0033 |

OTHER PUBLICATIONS

"International Application Serial No. PCT US2019 030628, Written Opinion dated Jul. 17, 2019", 7 pgs.

Uber, "Fast-Forwarding to a Future of On-Demand Urban Air Transportation", Uber Elevate, (Oct. 27, 2016), 98 pgs.

"International Application Serial No. PCT US2019 030628, International Preliminary Report on Patentability dated Jul. 23, 2020", 9 pgs.

"International Application Serial No. PCT US2019 030628, Response to Written Opinion filed Mar. 3, 20 to Written Opinion dated Jul. 17, 2019", 6 pgs.

* cited by examiner

QUAD-WING VERTICAL TAKEOFF AND LANDING AIRCRAFT

CROSS REFERENCE TO RELATED APPLICATIONS

This application claims the benefit of U.S. Provisional Application No. 62/666,652 filed May 3, 2018, which is incorporated by reference in its entirety.

TECHNICAL FIELD

The described subject matter generally relates to the field of aerial transportation and, more particularly, to a vehicle for vertical takeoff and landing that can serve multiple purposes, including the transportation of passengers and cargo.

BACKGROUND

In general, vertical takeoff and landing (VTOL) aircraft such as helicopters are designed to optimize hover efficiency for vertical flight, which generally correlates with a low cruise efficiency. Some existing vehicles in the emerging VTOL aircraft ecosystem rely on separate non-articulating rotors to provide vertical lift and forward thrust. However, this approach results in extra motor weight and aircraft drag since vertical lift rotors are ineffective during forward flight. Other existing aircrafts use a distributed set of tilting propulsors that rotate in the direction of flight to provide both vertical lift and forward thrust. While this approach reduces motor weight and aircraft drag, the articulating motor and propulsors result in increased design complexity with six to twelve tilting rotors required to provide the necessary lift and thrust.

SUMMARY

A vertical takeoff and landing (VTOL) aircraft uses propellers during vertical flight and wings during forward flight to generate lift. The VTOL aircraft has a front wing and a rear wing, and the wings are connected by an inboard boom on each side of a fuselage. The inboard booms are approximately parallel with the fuselage. In some embodiments, the aircraft is powered by batteries stored in the inboard booms. The rear wing includes a wing tip boom attached to each free end of the wing. A propeller is attached to each inboard boom and each wing tip boom. In some embodiments, the propellers attached to the inboard booms each include two co-rotating propellers. The propellers operate during vertical flight (e.g., takeoff and landing) and can be recessed within a respective boom during cruise configuration (e.g., forward flight). The aircraft can also include a cruise propeller attached to the tail region of the fuselage, where the cruise propeller is configured to rotate in a plane approximately perpendicular to the fuselage to generate thrust during forward flight. In some embodiments, the aircraft includes various control surfaces that are deployed during one or more modes of operation to balance the aircraft during flight. The aircraft may be configured to transport passengers and/or cargo.

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

DETAILED DESCRIPTION

Overview

Figure 1A:
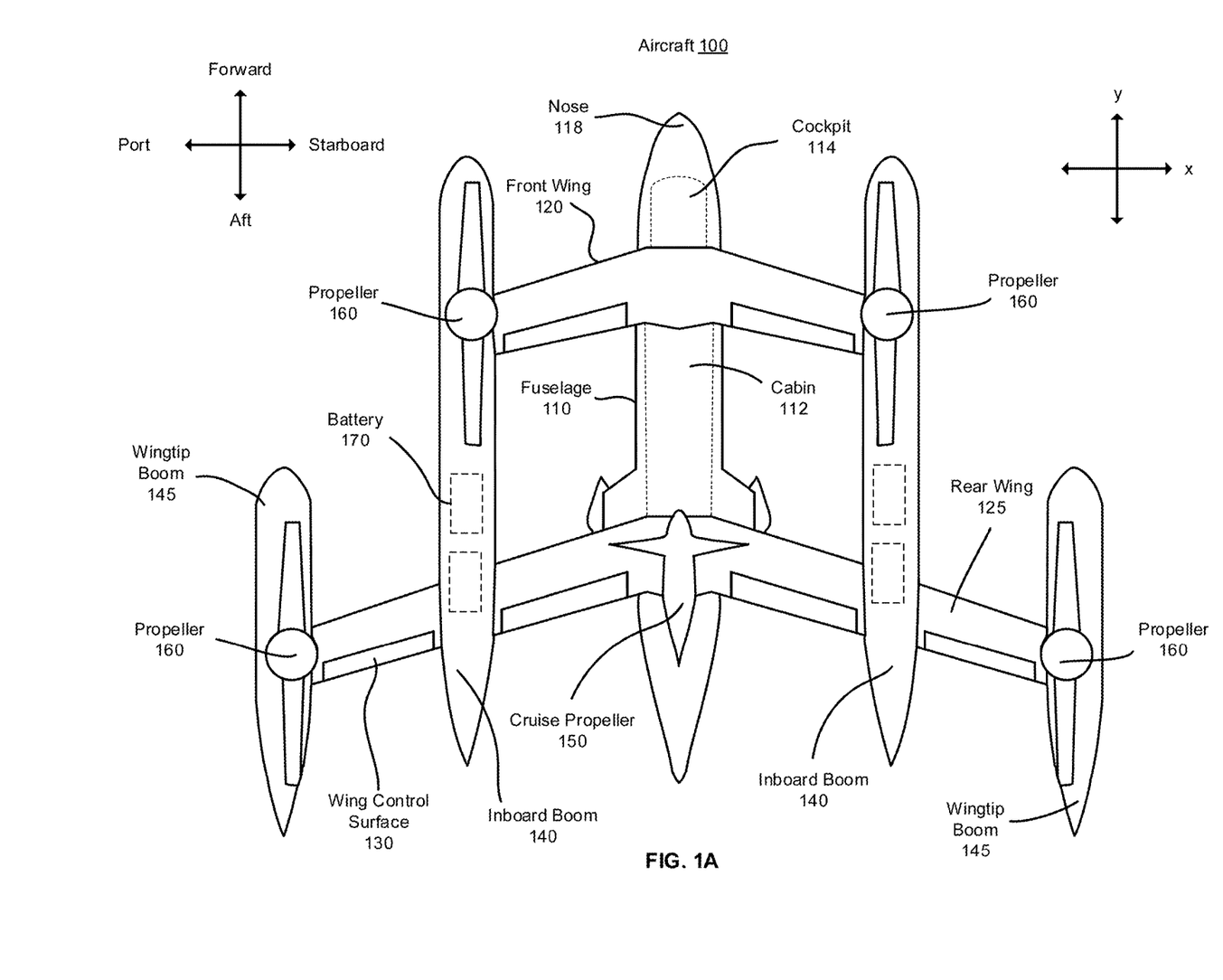
FIG. 1A is a top view of a VTOL aircraft, according to one or more embodiments.
Figure 1B:
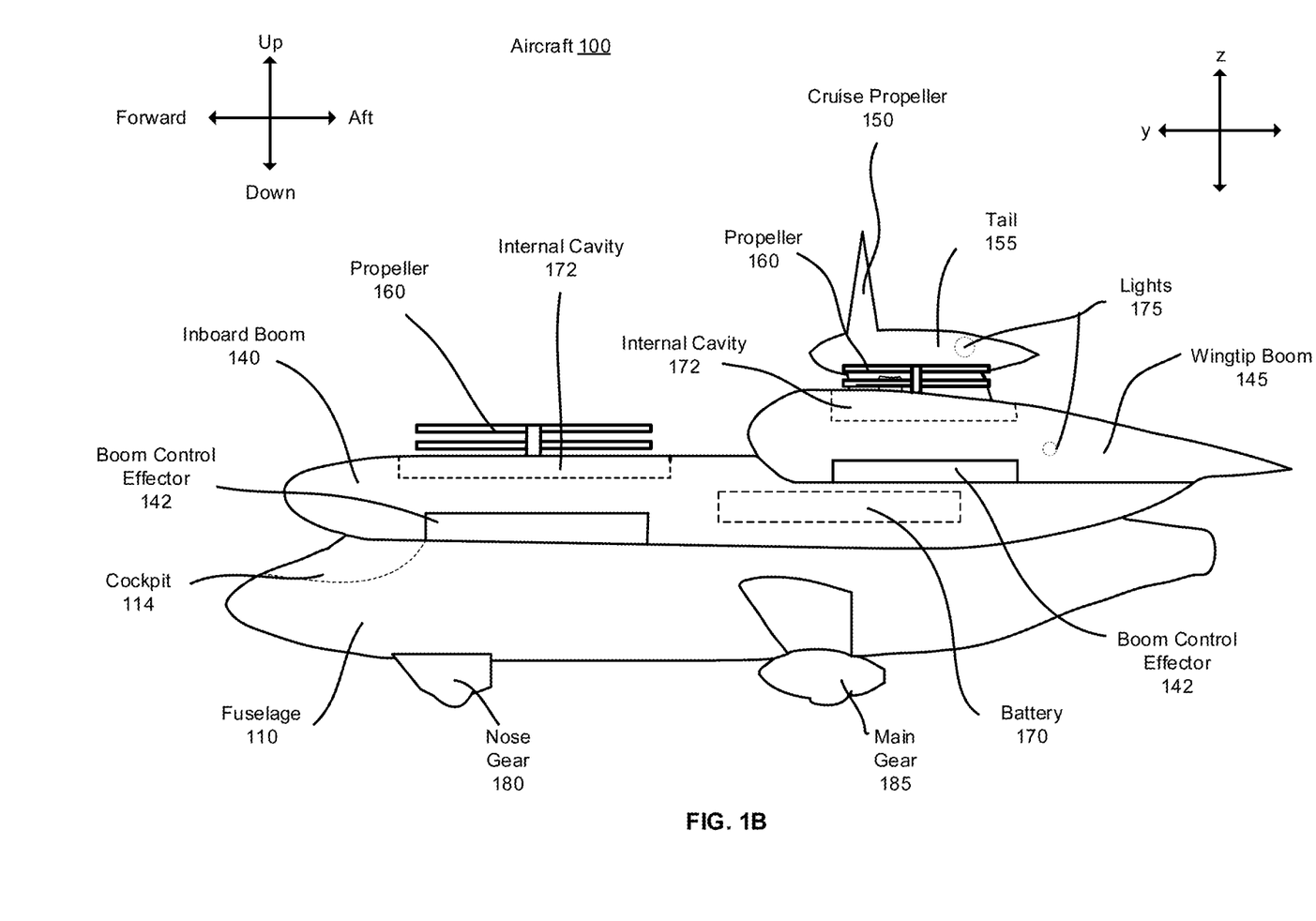
FIG. 1B is a side view of a VTOL aircraft, according to one or more embodiments.
Figure 1C:
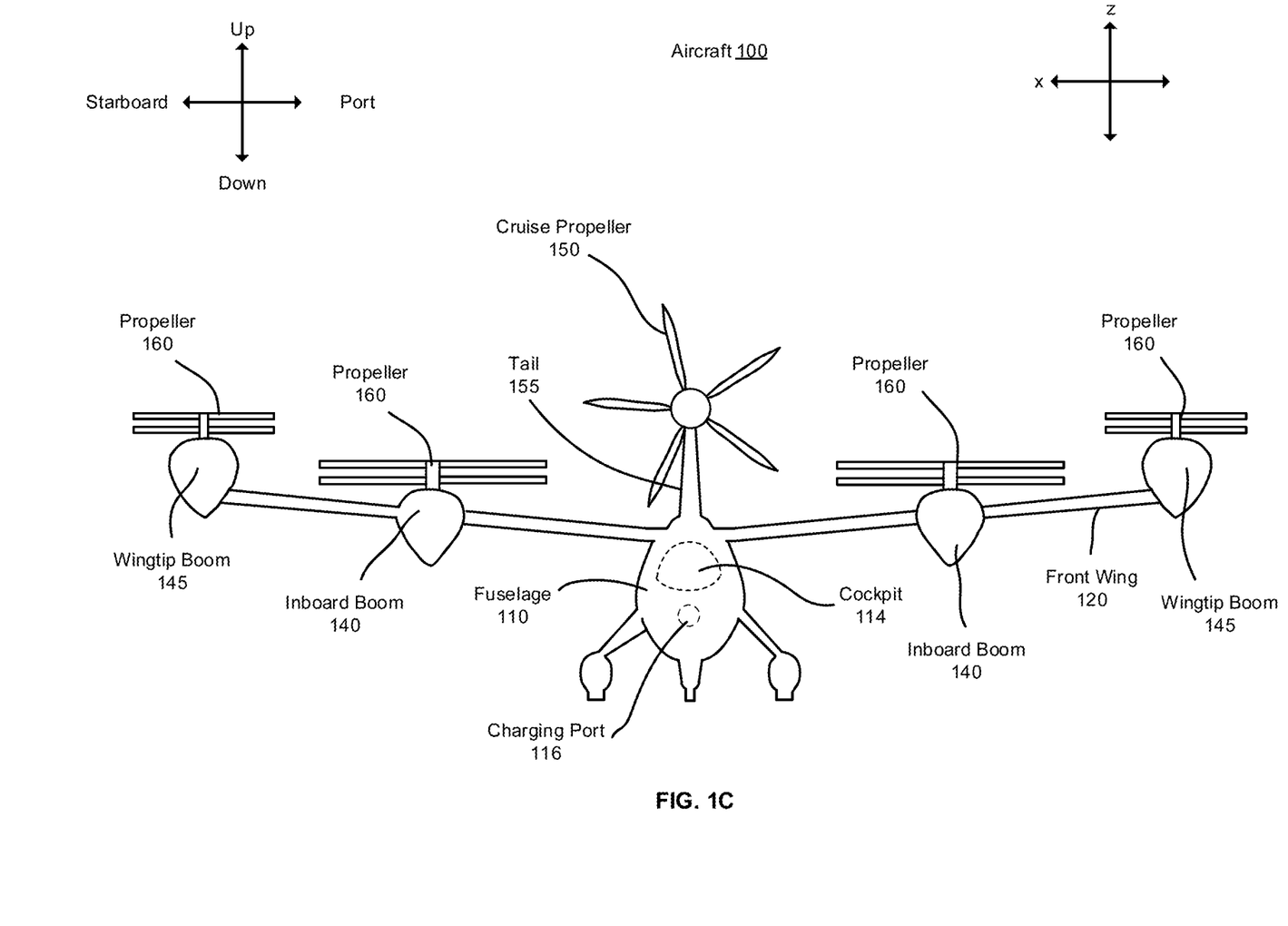
FIG. 1C is a front view of a VTOL aircraft, according to one or more embodiments.

FIGS. 1A-1C illustrate a quad-wing configuration VTOL aircraft 100 for transporting passengers and cargo, according to one or more embodiments. The VTOL aircraft 100 is a transitional aircraft that transitions from vertical flight using propellers to generate lift to forward flight using wings to generate lift. FIG. 1A is a top view of the VTOL aircraft 100, shown in an x-y plane where the z-axis is extending out of the page (e.g., towards the reader). The aircraft 100 is configured to move with respect to three axes: a roll axis, a yaw axis, and a pitch axis. In the embodiments of FIGS. 1A-1C, the roll axis is parallel with the y-axis, the pitch axis is parallel with the x-axis, and the yaw axis is parallel with the z-axis.

The VTOL aircraft 100 has a center of gravity, a center of thrust, and an aerodynamic center. In one or more modes of operation, the center of gravity, the center of thrust and the aerodynamic center are located at approximately the same position. The aerodynamic center is a point of an aircraft where the aerodynamic moment is constant. The aerodynamic moment is produced as a result of forces exerted on the aircraft 100 by the surrounding gas (e.g., air). The center of thrust is a point along the aircraft 100 where thrust is applied. As such, the components of the aircraft 100 can be arranged so that the aircraft 100 is balanced during vertical and forward flight. For example, components such as the control surfaces, propellers, and wings can function cooperatively to balance the aircraft 100 during different modes of operation.

The aircraft 100 includes a front wing 120 and a rear wing 125 attached to a fuselage 110. The front wing 120 and the rear wing 125 are connected by inboard booms 140. Wingtip booms 145 are attached to each free end of the rear wing 125. Propellers 160 are attached to each boom (e.g., 140, 145) to generate lift during vertical flight. A cruise propeller 150 is attached to a tail 155 of the aircraft 100. The cruise propeller 150 may be primarily used to generate thrust during forward flight, but can also be used to generate lift during vertical flight in other embodiments. Hinged control surfaces 130 on the front wing 120, rear wing 125, inboard booms 140, and/or wingtip booms 145 tilt during takeoff and landing to yaw the vehicle. In some embodiments, the VTOL aircraft 100 is an electric vehicle powered by batteries 170. As shown in FIG. 1A, the batteries 170 can be stored in the inboard booms 140. In other embodiments, the batteries 170 may be located elsewhere.

The configuration of the VTOL aircraft 100 may enable efficient vertical and forward flight. Currently, many aircraft are designed for efficiency during one mode of operation (e.g., helicopters are designed for efficiency during vertical flight, fixed wing aircraft are designed for efficiency during forward flight). The VTOL aircraft 100 may be efficient during both modes of operation and can allow for effective transition between vertical flight and forward flight. Because of the plurality of propellers, the VTOL aircraft 100 may require less power than traditional rotor aircrafts. Furthermore, many aircraft that include propellers are very noisy and are not well suited for residential areas. The VTOL aircraft 100 also includes components to mitigate noise generated as a result of propellers (e.g., 150, 160).

1.1 Fuselage

The VTOL aircraft 100 includes a fuselage 110 for transporting passengers, a pilot, and/or cargo. The fuselage 110 includes a cabin 112 configured to accommodate passengers and/or cargo. The fuselage 110 also includes a cockpit 114 with a control panel and seating for a pilot. In some embodiments, the cockpit 114 and cabin 112 are connected via a doorway or opening. In other embodiments, the cockpit 114 is separate from the cabin 112.

In the embodiment of FIGS. 1A-1C, cabin 112 includes seating for up to four passengers. In alternative embodiments, the cabin 112 can include a fewer or greater number of seats. In one embodiment, the seating is arranged in two parallel rows of two seats such that one row of passengers faces the tail 155 of the aircraft 100 while the other row of passengers faces a nose 118 of the aircraft 100. Alternatively, the seating may be arranged in a single row, where the row is parallel with the y-axis. The row of seats may include two sets of two seats, where the seats in a set are facing opposite directions such that the passengers in the first and third seats face the tail 155 of the aircraft 100 while passengers in the second and fourth seats face the nose 118 of the aircraft 100. In other configurations, all four seats face the nose 118 or the tail 155 of the aircraft 100. Furthermore, the passenger seating may be tiered such that one seat in a set of seats or one row of seats is elevated above another seat and/or row of seats to maximize space and provide a place for passengers to rest their feet. The passenger seating may have alternate configurations in order to distribute the payload weight in a manner such that the aircraft 100 is balanced during a mode of operation.

The cabin 112 can also include a view screen for providing information about the flight to the passengers. For example, the view screen can include information such as estimated arrival time, altitude, speed, information about origin and destination locations, and/or communications from the pilot. Furthermore, the cabin 112 can include a transparent panel along the top of the passenger compartment to allow passengers seated in the passenger compartment to see through the aircraft 100.

The fuselage 110 can include a plurality of exterior doors that allow users to access the aircraft 100. A first door may be located at the front (e.g., near the nose 118) of the fuselage 110 to allow a pilot to enter the cockpit 114. A second door may be located at an approximate midpoint of the fuselage 110 to allow passengers to enter the cabin 112. Finally, a third door can be located at the aft of the cabin 112 (e.g., near the tail 155) to allow for loading and unloading of cargo in the cabin 112. In alternative embodiments, the aircraft 100 can include a fewer or greater number of doors. The fuselage 110 can also include fixed or retractable landing gear attached to the exterior of the fuselage 110 to facilitate landing of the aircraft 100 and to allow the aircraft 100 to move short distances on the ground. FIG. 1B is a side view of the aircraft 100 illustrating a nose gear 180 and a main gear 185 attached to the fuselage 110. The nose gear 180 and/or the main gear 185 can retract and be stored in the fuselage 110 during one or more modes of operation to reduce drag. In alternative embodiments, the aircraft 100 may have landing skids protruding from the bottom of the fuselage and include attachment points for wheels. The fuselage 110 can also include space for crash structures.

The fuselage 110 may include a charging port 116 on the nose 118, shown in a front view of the aircraft 100 in FIG. 1C. As such, the aircraft 100 can be attached to a charging station to restore electrical power stored in the batteries 170. The batteries 170 can be located along the aircraft 100, such as in one of the wings (e.g., front wing 120, rear wing 125), in the fuselage 110, or in one of the booms (e.g., 140, 145), described in greater detail below. In some embodiments, the fuselage 110 includes a battery located inside the cabin 112. The battery may be separated from a surface of the fuselage 110 for crash resistance and/or to facilitate ventilation of the battery. The fuselage 110 can also include a battery door to allow for removal of the battery.

In general, the fuselage 110 is configured to support (e.g., structurally, mechanically) other aircraft 100 components. In one embodiment, the fuselage 110 of the VTOL aircraft 100 is approximately 25 to 35 feet long from the nose 118 of the aircraft 100 to the tail 155. The fuselage 110 is approximately 3 to 5 feet wide, and approximately 5 to 7 feet tall. The dimensions of the fuselage 110 can be optimized for transporting passengers and/or cargo while maintaining efficiency during flight. In other embodiments, the fuselage 110 can have any suitable dimensions for transporting passengers and/or cargo.

1.2 Wings and Booms

The aircraft 100 includes two wings, a front wing 120 and a rear wing 125, to provide lift to the aircraft 100 during forward flight (e.g., cruise configuration). In the embodiment of FIGS. 1A-1C, the aircraft 100 has two sides, a port side and a starboard side, separated by a midline, where the midline is parallel with the y-axis. The front wing 120 and the rear wing 125 are attached to the fuselage 110 such that a midpoint of the front wing 120 and a midpoint of the rear wing 125 are aligned with the midline of the fuselage 110. In some embodiments, each wing has two segments, a port segment and a starboard segment, joined at the midline of the fuselage 110 and extending outwards from the fuselage 110. The front wing 120 and rear wing 125 are arranged in an aft swept configuration such that a leading edge of each wing is located at the point at which the wings are attached to the fuselage 110 (e.g., along the midline of the fuselage 110). The leading edge is the edge of the wing that first contacts the air during forward flight. In one embodiment, the wings protrude outward and backward from the fuselage 110 at an approximately 5 to 25 degree angle (offset from an axis parallel to the x-axis). Thus, a free end of each wing is located behind the region of the wing fixed to the fuselage 110 (the free end of each wing is further from the nose 118 along the y-axis).

In the embodiment of FIGS. 1A-1C, the front wing 120 is attached approximately 5 to 7 feet from the nose 118 of the aircraft 100 and extends outward from the fuselage 110 approximately 7 to 12 feet towards each side (e.g., port, starboard). The rear wing 125 is attached to the fuselage 110 at a second point on the fuselage 110 approximately 10 to 12 feet aft of the front wing 120 (e.g., 15 to 19 feet from the nose 118). The rear wing 125 extends outward from the fuselage 110 approximately 15 to 22 feet towards each side (e.g., port, starboard). As such, a wing span of the front wing 120 is approximately 17 to 19 feet, and a wing span of the rear wing 125 is approximately 34 to 37 feet. An area of the front wing 120 is approximately 50 to 65 square feet, and an area of the rear wing 125 is approximately 105 to 120 square feet. In alternative embodiments, the wings can have any suitable dimensions such that the wings are able to provide lift to the aircraft during forward flight.

Inboard booms 140 are attached to each side of the aircraft 100 along the front wing 120. In the embodiment of FIGS. 1A-1C, the inboard booms 140 are attached at each free end of the front wing 120. The inboard booms 140 are also attached to each side of the rear wing 125. In one embodiment, each inboard boom 140 is approximately parallel to the fuselage 110 and as such, the inboard booms 140 are attached to the rear wing 125 at a point approximately 7 to 12 feet from the fuselage 110. The rear wing 125 also includes a wingtip boom 145 attached to each free end of the rear wing 125. In alternative embodiments, the inboard booms 140 and wingtip booms 145 can be located in another position along the aircraft 100. For example, the inboard booms 140 may join the front wing 120 at a point other than the free end (e.g., the front wing may extend beyond the inboard boom). The booms (e.g., 140, 145) may be shaped such that they are conformal to an aero shape to minimize drag, as shown by a trailing edge of the wingtip boom 145 in FIG. 1B. The leading edge of the booms (e.g., 140, 145) may also be curved in order to reduce drag.

In general, booms (e.g., 140, 145) contain ancillary items such as fuel tanks, but they can also be used for providing structural support to an aircraft. In the embodiment of FIGS. 1A-1C, the booms (e.g., inboard booms 140, wingtip boom 145) can be used to store aircraft components useful for operation. For instance, a boom can include electric motors and/or batteries 170 to power a propeller (e.g., 160) or other aircraft component. In some embodiments, a propeller 160 is driven by a Halbach array motor housed in a boom. In other embodiments, a propeller 160 is powered by a battery 170. The battery 170 can be located at the bottom of an inboard boom 140 and/or a wingtip boom 145 and span the length of the boom. In FIG. 1A, the aircraft 100 includes four batteries of approximately the same size and weight, and two batteries 170 are stored in each inboard boom 140. In one example, the batteries 170 can be 2020 Lithium Ion batteries or 2023 Lithium Metal batteries. As such, the batteries 170 may be easily replaced via a battery door located on an inboard boom 140.

In other embodiments, an inboard boom 140 and/or a wingtip boom 145 can include a battery and/or a component that functions as a counterweight to help maintain the balance and alignment of aircraft 100. The battery 170 can also be placed in a location in an inboard boom 140 or a wingtip boom 145 to minimize aero elastic and whirl flutter resonance during a mode of operation. In alternative embodiments, a battery 170 can be included in another position along the aircraft 100. The battery 170 can be used to power additional aircraft components such as a navigation light 175 on the outer surface of the wingtip boom 145 to alert other aircrafts of the position and direction of the aircraft 100, electronic components within the cabin 112, a control panel for the pilot, etc.

In an embodiment where an inboard boom 140 and/or a wingtip boom 145 is hollow, the boom can be used as a resonator to alter the noise signature of the aircraft 100 during one or more modes of operation. A Helmholtz resonator is a container of gas, such as air, with an open hole. A resonator can be tuned to the frequency of a propeller such that the noise resulting from the airflow over a propeller coupled to the boom (e.g. inboard boom 140, wingtip boom 145) is reduced. Sound produced as a result of pressure fluctuations generated by a propeller can be modified by the presence of a tuned volume inside a boom. Tuning the volume can permit acoustic and aerodynamic modification such that the radiated sound emitted by a propeller coupled to a boom is reduced. In one embodiment, a boom (e.g. inboard boom 140, wingtip boom 145) has an appropriate volume of air relative to the size of a propeller to act as a resonator. In a mode of operation when the stacked propellers (e.g., 160) are deployed (e.g., in use), an internal cavity 172 can function as the entrance for airflow into the resonator, as described below in relation to FIGS. 4A-4D. A portion of air flow over a stacked propeller can flow into the boom (e.g. inboard boom 140, wingtip boom 145) via the internal cavity 172 and the frequency of the boom can be tuned to reduce the noise produced by the propeller. Furthermore, as shown in FIG. 1B and described in greater detail below, a boom can include a boom control effector 142. A boom control effector 142 can operate in conjunction with a boom (e.g., inboard boom 140, tail boom 145) as a resonator to reduce noise. The rotation frequency of the boom control effector 142 can be configured to tune with the frequency of the resonator such that noise is further mitigated.

1.3 Propellers

The aircraft 100 includes a plurality of propellers for providing lift and thrust to the aircraft during different modes of operation. In the embodiment of FIGS. 1A-1C, the aircraft 100 includes a cruise propeller 150 that primarily operates during forward flight to provide forward thrust to the aircraft 100. The cruise propeller 150 is attached to the tail 155 such that it rotates in a plane approximately perpendicular to the fuselage 110. The tail 155 extends from the rear of the fuselage 110 and is approximately perpendicular to the rear wing 125. The cruise propeller 150 is located such that the airflow produced by the cruise propeller 150 does not interfere with other aircraft components (or at least such that any interference is reduced). The cruise propeller 150 may also use the rear wing 125 for noise shielding (e.g., to mitigate the amount of noise resulting from airflow over the propeller that is directed towards the ground). The cruise propeller 150 may be driven by a motor in the tail 155 with a digital controller.

In the embodiment shown in FIGS. 1A-1C, the cruise propeller 150 is a single rotor propeller with five blades. In alternative embodiments, the cruise propeller 150 can be a stacked propeller, as described below in relation to FIGS. 2A-2B, and/or can have greater or fewer blades to adjust the load that each blade must carry. The cruise propeller 150 may rotate clockwise or counterclockwise. In one embodiment, the cruise propeller 150 is approximately 7 to 9 feet in diameter. The cruise propeller 150 can alternatively have any suitable dimensions for providing thrust to the aircraft. The pitch of the cruise propeller 150 may be held at a fixed angle of attack or a variable angle such that the blades of the cruise propeller 150 can be partially rotated along the long axis to change the blade pitch. In alternative embodiments, the cruise propeller 150 may rotate such that during one mode of operation, the cruise propeller 150 rotates in a plane approximately parallel to the x-y plane and in another mode of operation, the cruise propeller 150 rotates in a plane approximately parallel to the x-z plane.

The aircraft 100 also includes a plurality of propellers (e.g., propellers 160) attached to the wings (e.g., 120, 125) and/or booms (140, 145) of the aircraft 100. The propellers 160 are configured to rotate in a plane approximately parallel to the x-y plane during one or more modes of operation. The propellers 160 are primarily used to generate lift during vertical flight (e.g., when airflow is moving in a direction approximately perpendicular to a rotational plane of a propeller 160). In alternate embodiments or in other modes of operation, the propellers 160 may be canted toward the fuselage 110 by up to approximately 8-14 degrees for sideslip and yaw control. The propellers 160 may also be angled toward the nose 118 or tail 155 of the aircraft 100 by up to approximately 7-9 degrees during a mode of operation.

In the embodiment shown in FIGS. 1A-1C, a propeller 160 is attached to each inboard boom 140 such that the propeller 160 is approximately aligned with a free end of the front wing 120. As such, the propellers 160 attached to the inboard booms 140 are approximately 5 to 7 feet behind the leading edge of each inboard boom 140. A propeller 160 is also attached to each wingtip boom 145 such that a propeller 160 is approximately aligned with each free end of the rear wing 125 (the propellers 160 may be attached at the approximate midpoint of the wingtip booms 145). In alternative embodiments, the propellers can be located anywhere along the front wing 120 and the rear wing 125 or along the inboard booms 140 and the wingtip booms 145. Each of the propellers 160 may have the same diameter of approximately 11 to 13 feet such that the total area is sufficient to lift the weight of the aircraft 100 during takeoff. For example, of an aircraft 100 of approximately 5,000 pounds, this configuration results in a disc loading of approximately 10 pounds per square foot. In alternative embodiments, each of the propellers 160 can have a specified diameter with any suitable dimensions such that the propellers 160 collectively provide sufficient thrust for takeoff.

The propellers 160 are arranged to generate lift during vertical flight and to maintain balance of the aircraft 100 in one or more modes of operation. The location of the propellers 160 along the aircraft 100 may prevent turbulent wake flow (e.g., turbulent air flow produced by a propeller 160) ingestion between propellers 160. The propellers 160 are located so that the airflow of one propeller 160 does not negatively interfere with the airflow of another propeller 160. The arrangement of the propellers 160 may also allow for a more elliptically shaped lift and downwash airflow distribution during transition configurations to achieve lower induced drag, power, and/or noise.

Figure 2A:
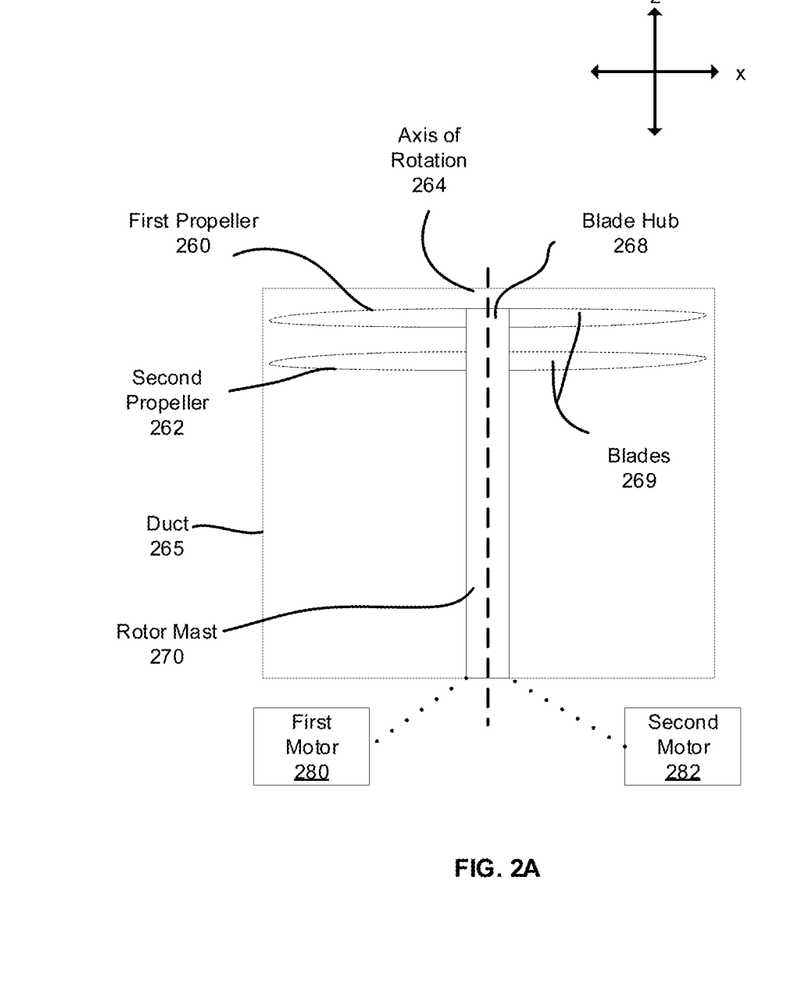
FIG. 2A is a side view of a stacked propeller, in accordance with one or more embodiments.
Figure 2B:
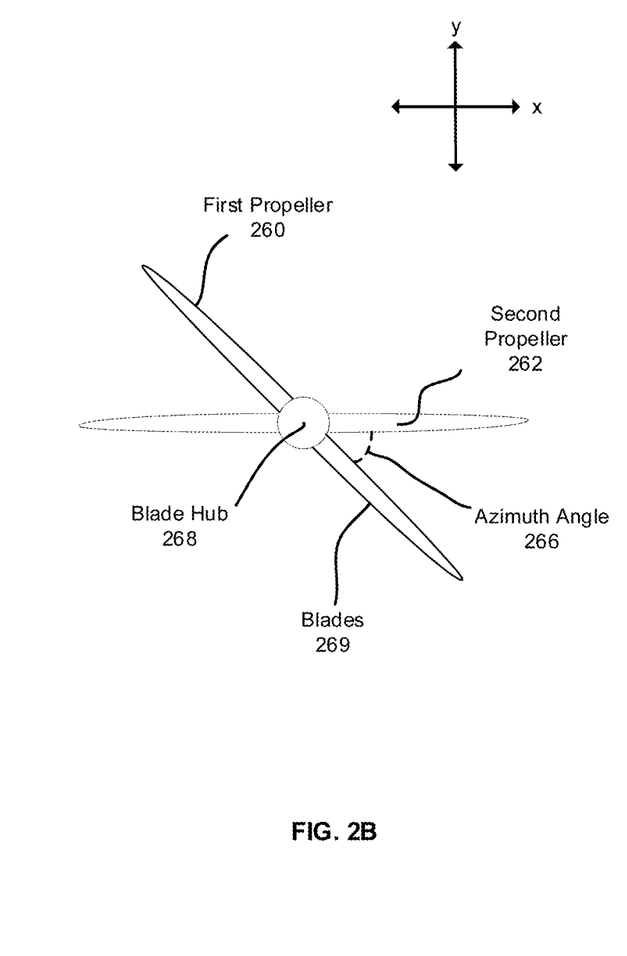
FIG. 2B is a top view of a stacked propeller, in accordance with one or more embodiments.

In one embodiment, the propellers 160 are stacked propellers, where a stacked propeller includes two co-rotating rotors that are stacked vertically (e.g., along an axis parallel to the z-axis). FIGS. 2A and 2B illustrate a side view and a top view of a stacked propeller, according to an embodiment. The stacked propeller includes a first propeller 260 and a second propeller 262. The first propeller 260 and the second propeller 262 each include two blades 269 coupled to a blade hub 268. The blades 269 of the first propeller 260 and the second propeller 262 co-rotate about an axis of rotation 264. The first propeller 260 and the second propeller 262 can have a variable pitch.

The first propeller 260 can be coupled (e.g., mechanically, electrically) to a first motor 280 and the second propeller 262 can be coupled to a second motor 282 to enable independent control of each propeller. The first motor 280 or the second motor 282 can control both the first propeller 260 and the second propeller 262 in some embodiments. For instance, if the first motor 280 fails (e.g., battery dies), the second motor 282 can control the rotation of the first propeller 260 and the second propeller 262. A stacked propeller can also include a clutch which allows the first propeller 260 and the second propeller 262 to lock together to ensure an appropriate azimuth angle 266 during a mode of operation. A clutch allows for a stacked propeller to provide thrust from both the first propeller 260 and the second propeller 262, even in a case where one of the motors (e.g., first motor 280) fails and the other motor (e.g., second motor 282) controls the rotation of the first propeller 260 and the second propeller 262. In some embodiments, a stacked propeller can include a single motor and a controller with a clutch used to control the azimuth angle 266 that is used in a mode of operation, and in other embodiments a stacked propeller can include two motors with independent controllers and a clutch used in a case when one of the motors fails. The first motor 280 and the second motor 282 can also control the precise azimuth angle 266, shown in FIG. 2B, of the first propeller 260 relative to the second propeller 262, when the blades are stationary or in motion. The azimuth angle 266 depends on the mode of operation of the aircraft, described in greater detail below.

The co-rotating propellers (e.g. first propeller 260, second propeller 262) may be synchronized such that they rotate at the same speed to reduce the noise generated by the aircraft 100. The azimuth angle 266 is constant when the first propeller 260 and second propeller 262 are rotating at the same speed (e.g., during steady flight). The azimuth angle 266 can depend on the shape of the blade 269 and/or the mode of operation. For instance, a specified shape, such as the shape shown in FIG. 2B, can have an offset angle of 5-15 degrees during different modes of operation.

The speed of the propellers may be adjusted based on the amount of thrust required to provide vertical ascent and descent and the amount of noise allowable in the geographic area in which the aircraft 100 is traveling. For example, the pilot might lower the speed of the aircraft 100, causing the aircraft 100 to climb more slowly, in areas in which a lower level of noise is desirable (e.g., residential areas). In one embodiment, the maximum speed of a free end of each of the blades 269 is 450 feet per second. This may keep the noise produced by the aircraft 100 below an acceptable threshold. In other embodiments, other maximum speeds may be acceptable (e.g., depending on the level of noise considered acceptable for the aircraft and/or aircraft environment, depending on the shape and size of the blades 269, etc.). During one or modes of operation, the plurality of propellers 160 are synchronized such that they rotate at the same speed to reduce the noise generated by the aircraft 100. In other modes of operation, the plurality of propellers 160 can rotate at different speeds (e.g., inboard propellers 160 rotate faster than wingtip propellers 160).

In one embodiment, a stacked propeller can be encapsulated in a duct 265. The duct 265 can surround the blades 269 and a rotor mast 270 to augment the flow over the first propeller 260 and/or the second propeller 262. The duct 265 can function to increase the thrust generated by a stacked propeller and/or adjust the pressure difference above and below the co-rotating propellers. The first propeller 260 and the second propeller 262 can be recessed within the duct 265, shown in FIG. 2A. In alternative embodiments, the first propeller 260 can be protruding from or flush with the duct 265 while the second propeller 262 is recessed within the duct 265. Similarly, the rotor mast 270 can be recessed within or protruding from the duct 265. In the embodiment of FIG. 2A, the duct 265 is a cylindrical body with a diameter slightly larger than the diameter of the first propeller 260 and the second propeller 262.

Co-rotating propellers may provide an advantage to single rotor propellers because they can produce less noise. Noise produced by propellers varies as an exponent of the tip speed of a propeller, thus, in order to reduce noise produced by a single rotor propeller, the aircraft speed is also reduced. A stacked propeller design also allows for flexibility of angles between the propellers which can be varied during different stages of flight functioning to increase the efficiency of the system. The speed and phase angle can be adjusted for each propeller on a stacked propeller, allowing for a more flexible and adaptable system. The stacked propellers can be stored during modes of operation where they are not necessary in order to reduce drag and improve efficiency.

The configuration of a stacked propeller can vary depending on the embodiment and requirements of the aircraft system and/or operation mode. In one embodiment, each co-rotating propeller (e.g., the first propeller 260, the second propeller 262) has the same blade shape, size, and profile while in other embodiments, the first propeller 260 and the second propeller 262 have different dimensions and an offset phase of rotation. For example, the first propeller 260 and the second propeller 262 may have different camber and twist such that, when the propellers are azimuthally separated, a stacked propeller (e.g., 160) is able to achieve optimal camber between the two surfaces. For example, in one embodiment, the diameter of the second propeller 262 is approximately 95% of the diameter of the first propeller 260.

In relation to material composition, a stacked propeller (e.g., 160) can be made from of a single material or can be a composite material able to provide suitable physical properties for providing lift to the aircraft. The first propeller 260 and the second propeller 262 can be made from the same material or different materials. For example, the first propeller 260 and the second propeller 262 can be made from aluminum, or the first propeller 260 can be made from steel and the second propeller 262 can be made from titanium. The blade hub 268 can be made from the same or different material than the first propeller 260 and the second propeller 262. Alternatively, the components of the system (e.g., the first propeller 260, the second propeller 262, the blade hub 268) can be made from a metal, polymer, composite, or any combination of materials. The stacked propeller may also be exposed to extreme environmental conditions, such as wind, rain, hail, and/or extremely high or low temperatures. Thus, the material of the stacked propeller can be compatible with a variety of external conditions.

In relation to mechanical properties, the material of the first propeller 260 and the second propeller 262 can have a compressive strength, a shear strength, a tensile strength, a strength in bending, an elastic modulus, a hardness, a derivative of the above mechanical properties and/or other properties that enable the propeller to provide vertical lift to the aircraft. The first propeller 260 and the second propeller 262 may experience extreme forces during operation including thrust bending, centrifugal and aerodynamic twisting, torque bending and vibrations. The material of the first propeller 260 and the second propeller 262 can have a strength and rigidity that allows the propellers to retain their shape under forces exerted on the propellers during various modes of operation. In one embodiment, the first propeller 260 and/or the second propeller 262 are composed of a rigid composite. Additionally, the edges or tips of the blades 269 can be lined with a metal to increase strength and rigidity.

In one embodiment or during a certain mode of operation, the first propeller 260 and the second propeller 262 may co-rotate in a counter clockwise direction. In a different mode of operation, the first propeller 260 and the second propeller 262 can co-rotate in a clockwise direction. In the embodiment of FIG. 1, the plurality of stacked propellers 160 along the aircraft can rotate in different directions based on the mode of operation. For example, the propellers 160 attached to the port side of the aircraft 100 can rotate in a clockwise direction and the propellers 160 attached to the starboard side of the aircraft 100 can rotate in a counter clockwise direction during a mode of operation. In other modes of operation, the propellers 160 attached to the inboard booms 140 can rotate in an opposite rotational direction to the propellers 160 attached to the wingtip booms 145. Furthermore, not all of the propellers 160 may be rotating during a mode of operation. The above description is not exclusive of the possible combinations of directions of rotation for each stacked propeller. The examples are used for illustration purposes.

Figure 3:
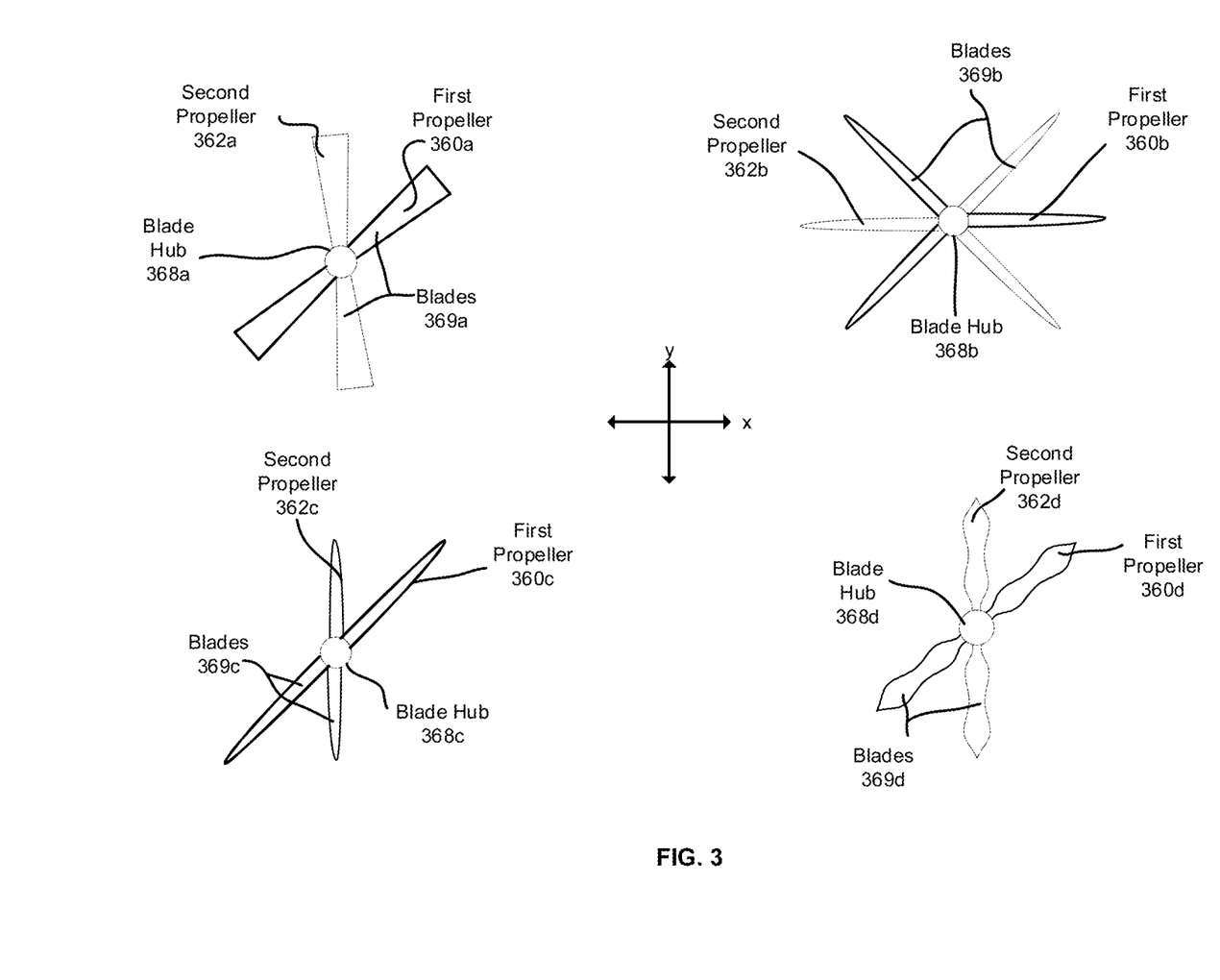
FIG. 3 illustrates various configurations of a stacked propeller, in accordance with several embodiments.

FIG. 3 illustrates a first embodiment (top left), a second embodiment (top right), a third embodiment (bottom left), and a fourth embodiment (bottom right), of a stacked propeller. A first embodiment (top left) shows a top view of a stacked propeller including a first propeller 360a and a second propeller 362a with angular blades 369a. The first propeller 360a and the second propeller 362a each includes two blades 369a. The width of the blades 369a is narrower at the blade hub 368a than at the free end of the blades 369a. A second embodiment (top right) of FIG. 3 includes a first propeller 360b with three blades 369b and a second propeller 362b with three blades 369b. The blades 369b are wider at the blade hub 368b than at the free ends of the blades 369b. The free ends of the blades 369b are round. A third embodiment (bottom left) of FIG. 3 shows a schematic including a first propeller 360b and a second propeller 362b each including two blades 369b coupled to a blade hub 368c. The blades 369b of the propellers are wider at the blade hub 368c than at the free end. The diameter of the second propeller 362c is smaller than the diameter of the first propeller 360c. A fourth embodiment (bottom right) of FIG. 3 includes a propeller with a first propeller 360d and a second propeller 362d, each including two blades 369d coupled to a blade hub 368d. The blades 369d are curved along the length from the blade hub 368d to the free end of the blades 369d.

FIG. 3 shows several embodiments and combinations of embodiments of a stacked propeller. Alternatively, a stacked propeller can have different characteristics (e.g., shape, orientation, size) and different combination of embodiments to satisfy the design constraints (e.g., load capacity, manufacturing limitations) of an aircraft. A stacked propeller 160 can also have a different number of propellers each with a different number of blades to improve aircraft efficiency or reduce noise. In one embodiment, a stacked propeller includes a different blade pitch and different twist distributions on each set of blades. A first propeller (e.g., a top propeller) may have a lower pitch to induce an airflow, while a second propeller (e.g, a propeller below a top propeller) can have a higher pitch to accelerate the airflow. The twist distribution can be configured to stabilize an interaction of a tip vortex (e.g., vortex produced by the tip speed of the upper blade) with a lower blade in order to produce optimal thrust.

1.4 Control Surfaces

The aircraft 100 can include various control surfaces for adjusting pitch and yaw during various modes of operation. In one embodiment, wing control surfaces 130 span the trailing edge of the front wing 120 and the rear wing 125 and are hinged for deployment during one or more modes of operation. For example, the wing control surfaces 130 are neutral during a parked configuration but are pitched downward approximately 40 degrees to facilitate takeoff. The control surfaces 130 are controlled by flap actuators on each wing that adjust an angle at which the control surfaces 130 are disposed. The wing control surfaces 130 can be independently actuated such that each control surface 130 can have a different angle during a mode of operation. As shown in FIG. 1A, the front wing 120 includes a wing control surface 130 between the fuselage 110 and each inboard boom 140, and the rear wing 125 has a first wing control surface between the fuselage 110 and each inboard boom 140 and a second wing control surface 130 between each inboard boom 140 and each wingtip boom 145. In alternative embodiments, the aircraft 100 can include any number of wing control surfaces 130.

The inboard booms 140 and/or the wingtip booms 145 can also include control surfaces, shown in the side view of the aircraft 100 in FIG. 1B. The control surfaces can be boom control effectors 142 located below a propeller 160. Boom control effectors 142, described in greater detail below, are configured to rotate about an axis parallel to the y-axis to yaw the aircraft 100. For example, while boom control effectors 142 are neutral during a cruise configuration, they rotate slightly (e.g., at approximately 5 to 10 degrees) during descent to yaw the aircraft 100 into the correct orientation. When the aircraft 100 is in a vertical takeoff and landing configuration, the propellers 160 blow air past the inboard booms 140 and the wingtip booms 145 to produce lift. A boom control effector 142 facilitates the airflow over the boom. A cross sectional view of an embodiment of a boom (e.g., a wingtip boom 145, an inboard boom 140) including a boom control effector is shown by FIGS. 4A-4D.

FIGS. 4A-4D demonstrate the flow of air over the boom during different modes of operation. The schematic includes a first propeller 460, a second propeller 462, a blade hub 468, blades 469, a rotor mast 470, and an internal cavity 472. The rotor mast 470 can be a boom, and the boom can include a boom control effector 425 configured to rotate about an axis perpendicular to an axis of rotation 464. A boom control effector can be a single effector as described by FIGS. 4A-4D or a split effector. A split effector may operate in conjunction with a boom that operates as a resonator to reduce noise produced by the propeller. The split effector can include two boom control effectors attached to a single rotor mast 470.

Figure 4A:
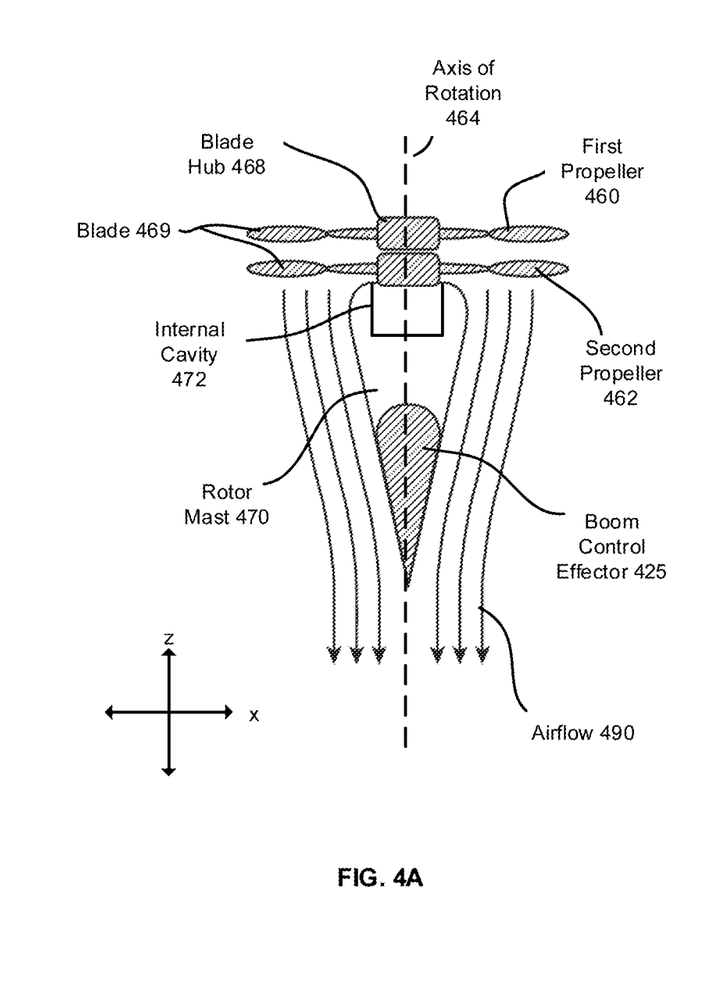
FIG. 4A illustrates a configuration of a stacked propeller during a first mode of operation, in accordance with one or more embodiments.
Figure 4B:
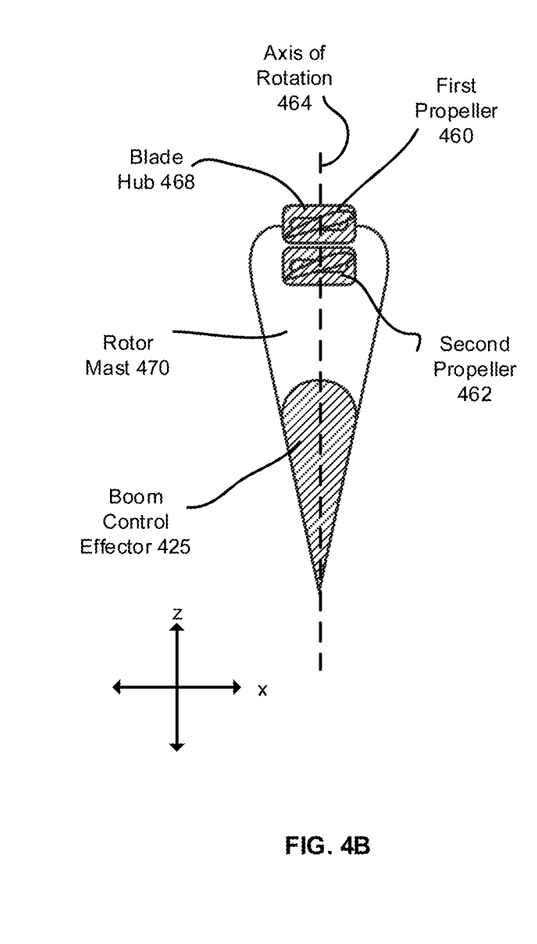
FIG. 4B illustrates a configuration of a stacked propeller during a second mode of operation, in accordance with one or more embodiments.

FIG. 4A illustrates the boom control effector 425 during a mode of operation, such as a vertical takeoff configuration. The boom control effector 425 is in a neutral position in FIG. 4A. An airflow 490 generated by the propellers (e.g., first propeller 460, second propeller 462) is not separated from the surface of the boom. The airflow 490 is directed downwards (e.g., in the z-direction). FIG. 4B illustrates a mode of operation, such as a cruise configuration, where the propellers (e.g., first propeller 460, second propeller 462) are recessed within an internal cavity 472. When the propellers (e.g., first propeller 460, second propeller 462) are recessed within the cavity 472, the boom control effector 425 may not be in operation (e.g., the boom control effector remains in a neutral position).

Figure 4C:
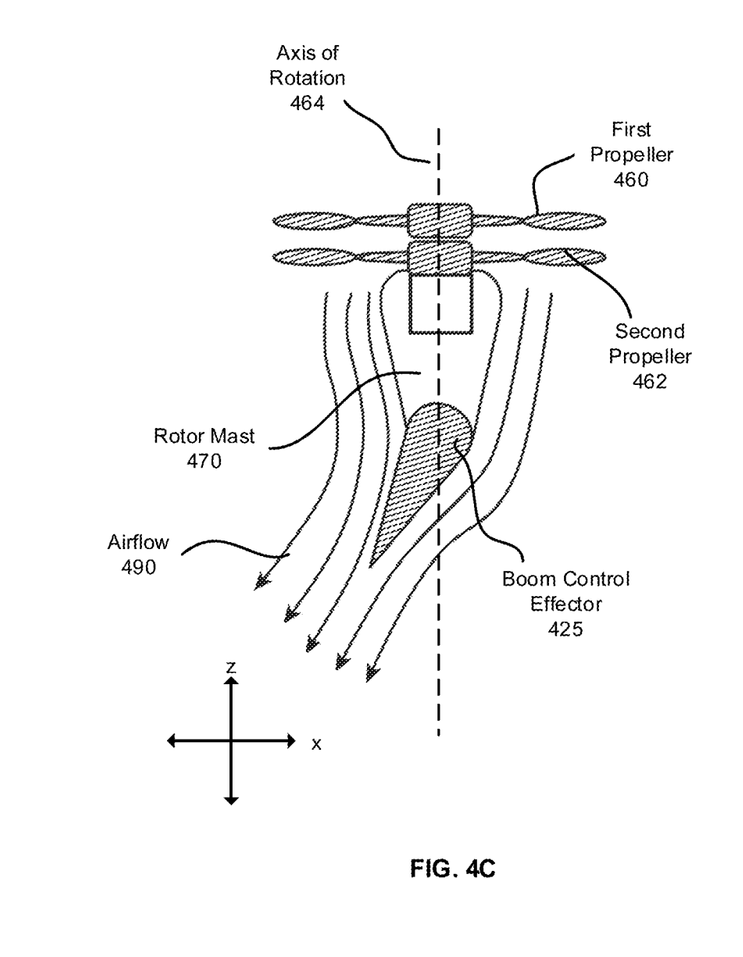
FIG. 4C illustrates a configuration of a stacked propeller during a third mode of operation, in accordance with one or more embodiments.
Figure 4D:
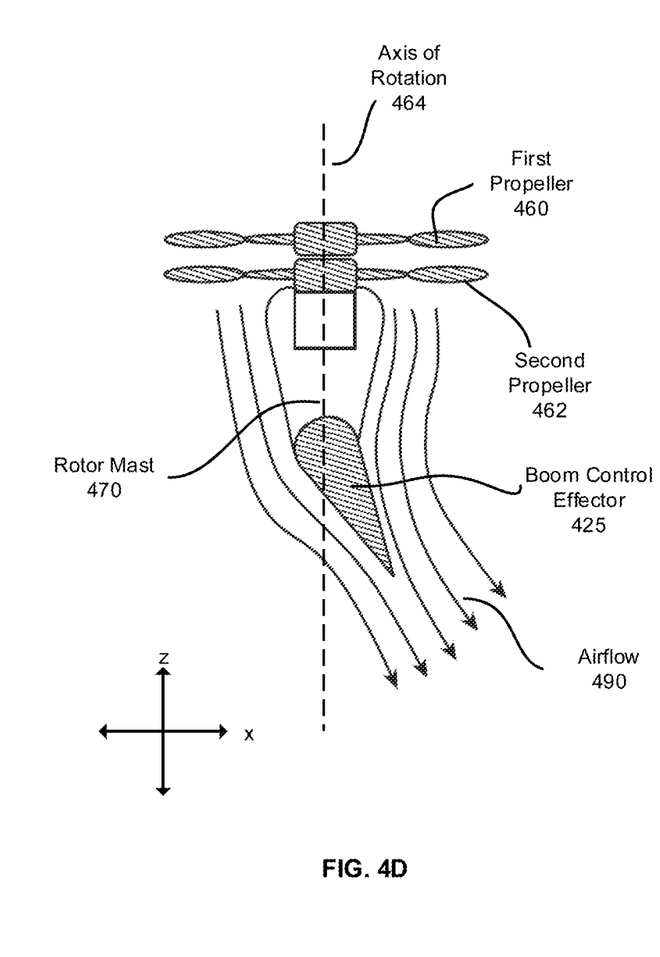
FIG. 4D illustrates a configuration of a stacked propeller during a fourth mode of operation, in accordance with one or more embodiments.

FIGS. 4C-4D illustrate two other modes of operation of a boom control effector, according to an embodiment. FIGS. 4C-4D illustrate a boom control effector 425 rotated about an axis perpendicular to an axis of rotation 464 (e.g., an axis extending from the page). The angle of the boom control effector 425 directs the downstream airflow 490 in a direction offset from an axis parallel to the z-axis (i.e. to the left or right) of the boom during various modes of operation. The angle of the boom control effector 425 can be manually controlled or automated during different modes of operation. The angle can be held constant during a mode of operation or may change based on environmental conditions. Alternatively, the boom control effector 425 can be configured to continuously oscillate about an axis perpendicular to the axis of rotation 464. The oscillation frequency can be tuned to align with the frequency of a boom that functions as a resonator, as described above. In alternative embodiments, the boom control effector 425 can be configured to direct the airflow 490 in another direction. The movement of the boom control effector 425 is configured to control the cross wind of the propeller and mitigate the acoustic signature of the propeller. The boom control effector 425 can control the direction of the airflow 490, which may result in a significant reduction in noise produced by the propeller. It may also allow for enhanced yaw control of an aircraft. The boom control effector 425 can also improve efficiency and reduce power consumed by the aircraft 100 by realigning the airflow.

In FIGS. 4A-4D, the boom control effector 425 has a teardrop shape. In other embodiments, the boom control effector 425 can have another shape suitable for mitigating noise and directing airflow. For instance, the boom control effector 425 can have a split configuration such that during a mode of operation, the boom control effector 425 has multiple longitudinal surfaces that can control airflow direction. The split configuration can be configured to allow the boom to act as a resonator, as described above. In one embodiment, boom control effector 425 and a corresponding boom (e.g., wingtip boom 145, inboard boom 140) have a non-circular cross section to reduce undesired effects (e.g., aeroelastic and whirl flutter) of aerodynamic forces on the aircraft 100. The boom control effector 425 can also have a rectangular end region coupled to the rotor mast 470 and a pointed or rounded free end region. The shape of the boom control effector 425 depends on design considerations (e.g., size of the propellers, location of the propellers, aircraft load capacity, etc.) of the aircraft.

In relation to material composition, boom control effector 425 can be made from of a single material or can be a composite material able to provide suitable physical properties for controlling the direction of airflow behind a propeller. The boom control effector 425 can be made from the same material or a different material than the rotor mast 470. The boom control effector 425 may also be exposed to extreme environmental conditions, such as wind, rain, hail, and/or extremely high or low temperatures. Thus, the material of the boom control effector 425 can be compatible with a variety of external conditions.

In relation to mechanical properties, the material of the boom control effector 425 can have a compressive strength, a shear strength, a tensile strength, a strength in bending, an elastic modulus, a hardness, a derivative of the above mechanical properties and/or other properties that enable the boom control effector 425 to direct the airflow 490 behind or below a propeller. The boom control effector 425 may experience extreme forces during operation including thrust bending, centrifugal and aerodynamic twisting, torque bending and vibrations. The material of the boom control effector 425 can have a strength that allows the boom control effector 425 to retain its shape under forces exerted on the boom control effector 425 during various modes of operation.

As described above, a boom control effector (e.g., 425) can be a control surface of the aircraft 100. A side view of the aircraft 100 illustrating a boom control effector is shown in FIG. 1B. The side view illustrates a boom control effector 142 coupled to an inboard boom 140 and a wingtip boom 145. A boom control effector 142 extends along a longitudinal surface of the inboard boom 140 and the wingtip boom 145 such that the length of the boom control effector 142 is approximately equal to a diameter of the propeller 160 attached to the corresponding boom. In alternative embodiments, the diameter of the propeller 160 can be larger or smaller than the length of the boom control effector 142. The internal cavity 172 described above in relation to FIGS. 4A-4D can have a length similar to the length of the boom control effector 142. In alternative embodiments, an inboard boom 140 and/or a wingtip boom 145 can have more than one boom control effectors 142. Similarly, only some of the booms attached to the aircraft 100 may include boom control effectors 142. Alternatively, a boom control effector can be coupled to a surface to direct airflow behind a single rotor propeller. The boom control effectors 142 can be independently actuated such that each boom control effector 142 can have a different angle during a mode of operation.

1.5 Modes of Operation

FIGS. 1A-1C illustrate the aircraft 100 in a configuration for vertical flight (e.g., takeoff and landing), according to an embodiment. During vertical flight, the propellers 160 are deployed and rotating. The wing control surfaces 130 may be deployed at an angle from 0 to 40 degrees for yaw control. In some embodiments, the wing control surfaces 130 may be deployed at the same angle, or the wing control surfaces 130 can be deployed at varying angles. The cruise propeller 150 may be stationary during vertical flight. The boom control effectors 142 may be in a neutral position or may be angled approximately 0 to 15 degrees, as shown in FIGS. 4C and 4D and described above, such that the airflow generated by the propellers 160 is angled in a specified direction.

Figure 5A:
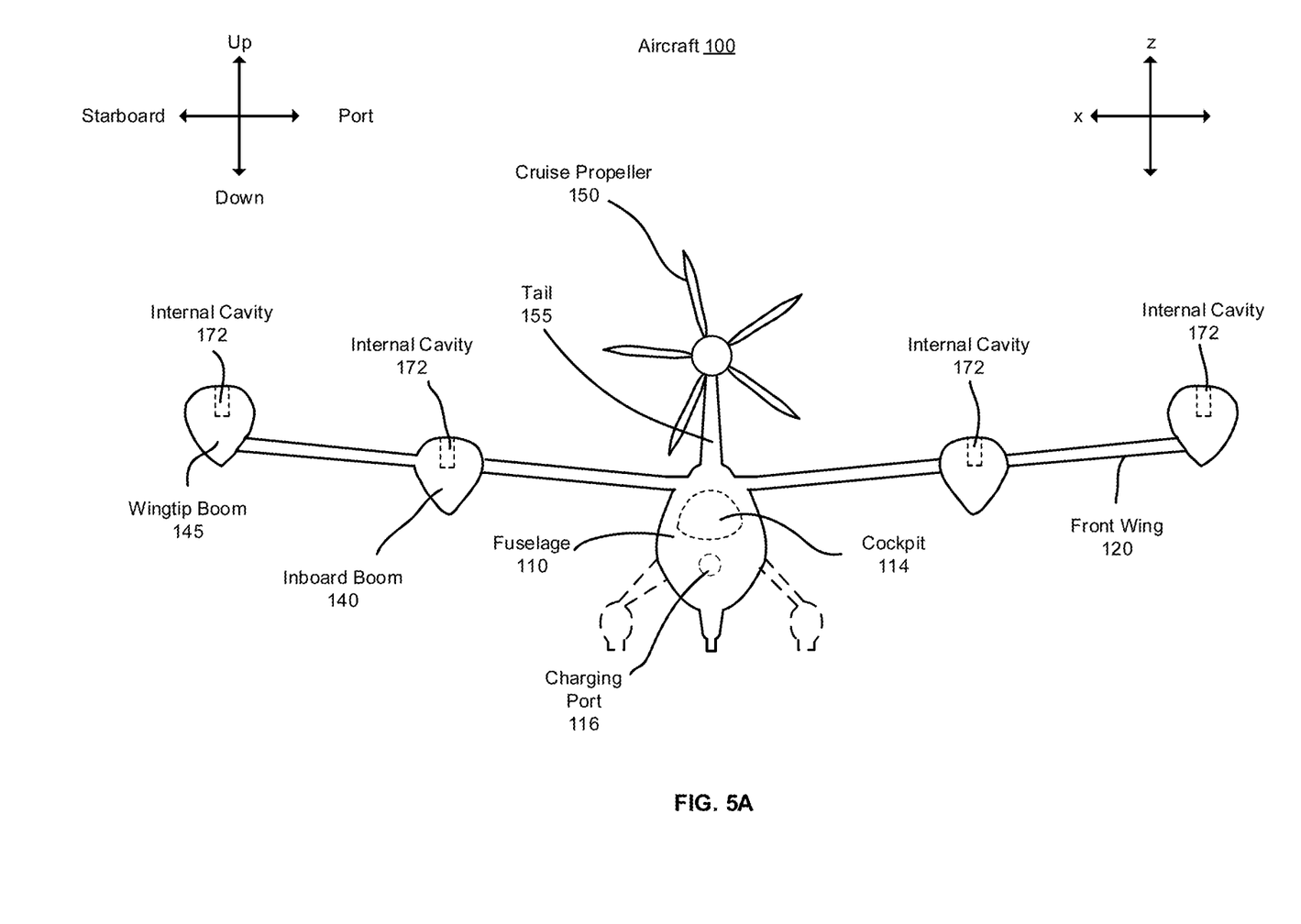
FIG. 5A is a front view of a VTOL aircraft in a cruise configuration, according to one or more embodiments.
Figure 5B:
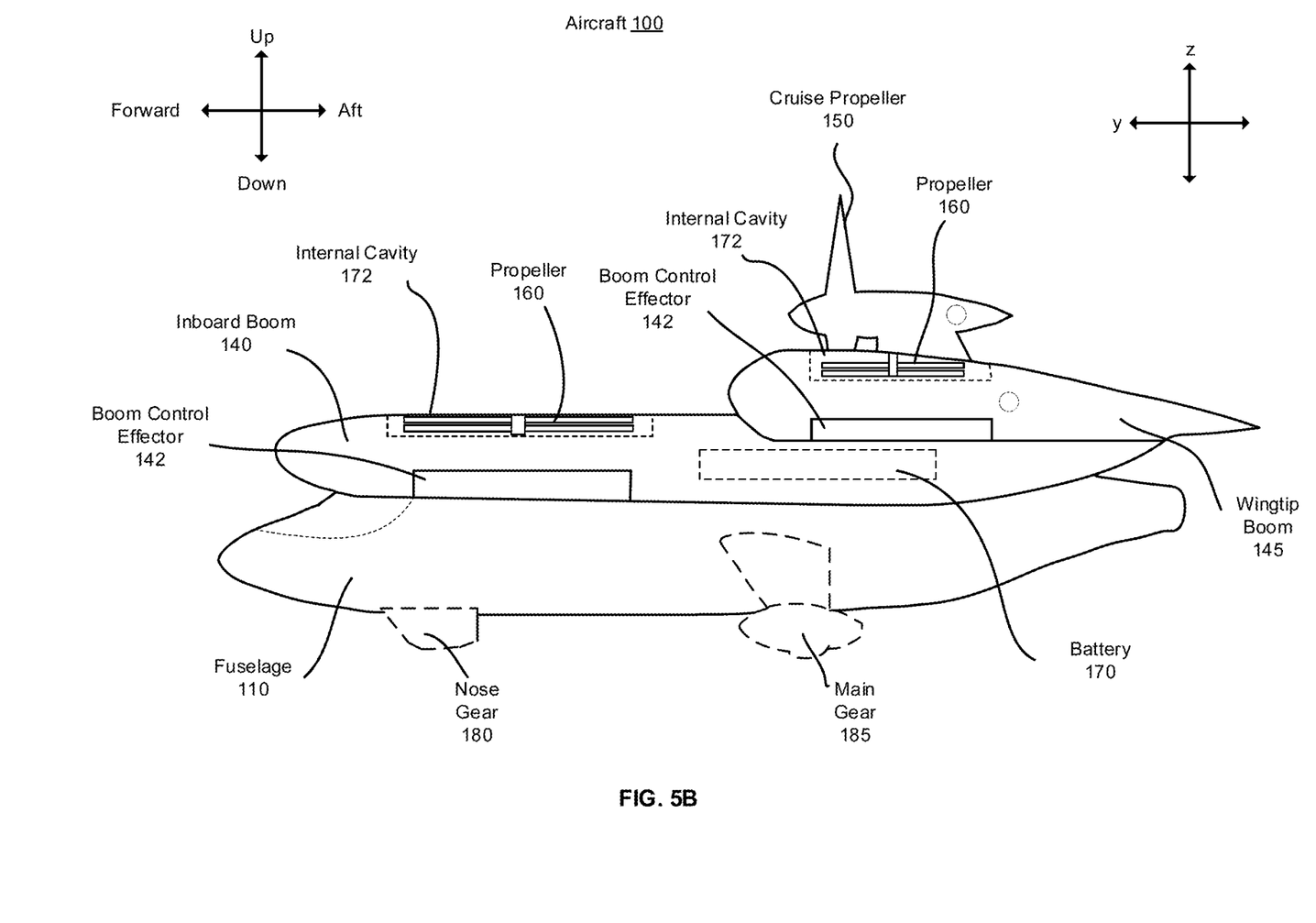
FIG. 5B is a side view of a VTOL aircraft in a cruise configuration, according to one or more embodiments.

The aircraft 100 transitions from vertical flight to forward flight using its components to facilitate efficient transition. FIGS. 5A-5B illustrate the aircraft 100 in a configuration for forward flight. FIG. 5A is a front view of the aircraft 100 during forward flight and FIG. 5B is a side view of the aircraft 100 during forward flight. The hinged control surfaces 130 and boom control effectors 142 may return to a neutral position in order to reduce drag. In some embodiments, the nose gear 180 and the main gear 185 may be recessed in the fuselage 110. The cruise propeller 150 may be rotating in a clockwise direction to produce thrust to propel the aircraft 100 in forward flight. During forward flight, the aircraft 100 relies on the front wing 120 and the rear wing 125 for lift. As such, the propellers 160 can be recessed in the internal cavities 172. The propellers 160 may be retracted along an axis of rotation and recessed below a surface of a boom (e.g., 140, 145) such that airflow is conformal to the surface of a boom as the aircraft moves forward. In other embodiments, the propellers 160 may be retracted during forward flight, but may be protruding from a boom (e.g., 140, 145).

The aircraft 100 transitions from forward flight to vertical flight for landing. The landing configuration is substantially the same as the takeoff configuration, shown in FIGS. 1A-1C. The wing control surfaces 130 and boom control effectors 142 can be hinged for yaw control. The main noise gear 180 and main gear 185 can be deployed for landing and the propellers 160 can be deployed and begin rotating to generate lift. In some embodiments, the propellers 160 may be re-deployed simultaneously, or propellers may be re-deployed at different times. The cruise propeller 150 can stop rotating during vertical flight.

ADDITIONAL CONSIDERATIONS

The description has been presented for the purpose of illustration; it is not intended to be exhaustive or to limit the invention to the precise forms disclosed. Persons skilled in the relevant art can appreciate that many modifications and variations are possible in light of the above disclosure.

Aspects of the invention, such as software for implementing the processes described herein, may be embodied in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention.

What is claimed is:

1. An aircraft comprising:
   a fuselage;
   a front wing and a rear wing mounted to the fuselage, each wing having a port segment and a starboard segment extending outward and backward from the fuselage;
   a first inboard boom attached at a first point along the starboard segment of the front wing and attached at a second point along the starboard segment of the rear wing;
   a second inboard boom attached at a first point along the port segment of front wing and at a second point along the port segment of the rear wing;
   a set of propellers including a first propeller, a second propeller, and a third propeller, wherein the first propeller and the second propeller are coupled to the front wing and the third propeller is coupled to the rear wing;
   a tail extending from the rear of the fuselage, the tail arranged substantially orthogonal to the rear wing;

a cruise propeller attached to the tail, the cruise propeller configured to rotate in a plane substantially perpendicular to a rotational plane of the set of propellers;
a first wingtip boom coupled to a free end of the starboard segment of the rear wing; and
a second wingtip boom coupled to a free end of the port segment of the rear wing,
wherein one of the first wingtip boom or the second wingtip boom is configured as a resonator tuned to a frequency of the third propeller during a mode of operation.

2. The aircraft of claim 1, wherein the first point along the starboard segment of the front wing is a free end of the starboard segment of the front wing and the first point along the port segment of the front wing is a free end of the port segment of the front wing.

3. The aircraft of claim 1, wherein the first propeller is attached to the front wing at a free end of the starboard segment of the front wing and the second propeller is attached to the front wing at a free end of the port segment of the front wing.

4. The aircraft of claim 1, wherein the third propeller is recessed within a cavity of the aircraft during a mode of operation.

5. The aircraft of claim 1, wherein at least one of the first inboard boom or the second inboard boom is configured to retain a battery.

6. The aircraft of claim 1, wherein at least one of the first inboard boom or the second inboard boom includes a rotatable control surface positioned below one of the set of propellers and boom control effector configured to direct airflow generated by the one propeller.

7. The aircraft of claim 1, wherein the first propeller, the second propeller, and the third propeller have equal diameters.

8. The aircraft of claim 1, wherein at least one of the propellers in the set of propellers includes a set of co-rotating propellers.

9. The aircraft of claim 1, further comprising a fourth propeller coupled to a free end of the port segment of the rear wing, and wherein the third propeller is coupled to a free end of the starboard segment of the rear wing.

10. The aircraft of claim 1, wherein the first propeller is configured to recess within a cavity of the first inboard boom and the second propeller is configured to recess within a cavity of the second inboard boom during a mode of operation.

11. The aircraft of claim 1, wherein the first propeller rotates in a direction opposite to the rotational direction of the second propeller during a mode of operation.

12. The aircraft of claim 1, wherein the front wing and the rear wing extend outward and backward from the fuselage at an angle of up to 25 degrees with respect to an axis perpendicular to the fuselage.

13. The aircraft of claim 1, further comprising a set of batteries, each of the batteries substantially of equal size and weight, the set of batteries configured to power the aircraft.

14. The aircraft of claim 1, further comprising a set of wing control surfaces, wherein the wing control surfaces are pitched downward during a mode of operation.

15. The aircraft of claim 1, wherein a total area of discs of the set of propellers yields a disc loading of less than 15 pounds per square foot.

16. The aircraft of claim 1, wherein the first inboard boom and the second inboard boom are substantially parallel with the fuselage.

17. An aircraft comprising:
a fuselage;
a front wing and a rear wing mounted to the fuselage, each wing having a port segment and a starboard segment extending outward and backward from the fuselage;
a first inboard boom attached at a first point along the starboard segment of the front wing and attached at a second point along the starboard segment of the rear wing;
a second inboard boom attached at a first point along the port segment of front wing and at a second point along the port segment of the rear wing;
a first set of propellers coupled to the front wing;
a second set of propellers coupled to the rear wing;
a tail having a first end and a second end, the first end connected to the fuselage and the tail extending therefrom substantially orthogonal to the rear wing;
a cruise propeller attached to the second end of the tail, the cruise propeller configured to rotate in a plane substantially perpendicular to a rotational plane of the second set of propellers
a first wingtip boom coupled to a free end of the starboard segment of the rear wing; and
a second wingtip boom coupled to a free end of the port segment of the rear wing,
wherein one of the first wingtip boom or the second wingtip boom is configured as a resonator tuned to a frequency of the third propeller during a mode of operation.

18. An aircraft comprising:
a fuselage;
a front wing and a rear wing mounted to the fuselage, each wing having a port segment and a starboard segment extending outward and backward from the fuselage;
a first inboard boom attached at a first point along the starboard segment of the front wing and attached at a second point along the starboard segment of the rear wing;
a second inboard boom attached at a first point along the port segment of front wing and at a second point along the port segment of the rear wing;
a first propeller coupled to the first inboard boom proximate the front wing;
a second propeller coupled to the second inboard boom proximate the front wing;
a third propeller coupled to a first wingtip boom proximate the rear wing;
a fourth propeller coupled to a second wingtip boom proximate the rear wing;
a tail having a first end and a second end, the first end connected to the fuselage and the tail extending therefrom substantially orthogonal to the rear wing;
a cruise propeller attached to the second end of the tail, the cruise propeller configured to rotate in a plane substantially perpendicular to a rotational plane of the set of propellers;
a first wingtip boom coupled to a free end of the starboard segment of the rear wing; and
a second wingtip boom coupled to a free end of the port segment of the rear wing,
wherein one of the first wingtip boom or the second wingtip boom is configured as a resonator tuned to a frequency of the third propeller during a mode of operation.

* * * * *

UNITED STATES PATENT AND TRADEMARK OFFICE
CERTIFICATE OF CORRECTION

| | | |
|---|---|---|
| PATENT NO. | : 11,267,570 B2 | Page 1 of 1 |
| APPLICATION NO. | : 16/356276 | |
| DATED | : March 8, 2022 | |
| INVENTOR(S) | : Villa et al. | |

It is certified that error appears in the above-identified patent and that said Letters Patent is hereby corrected as shown below:

In the Claims

In Column 16, Line 21, in Claim 17, after "propellers", insert --;--

Signed and Sealed this
Tenth Day of May, 2022

Katherine Kelly Vidal
*Director of the United States Patent and Trademark Office*